March 13, 1934.     B. WOLFELD     1,951,227
MILK BOTTLE LOCK
Filed Feb. 8, 1933
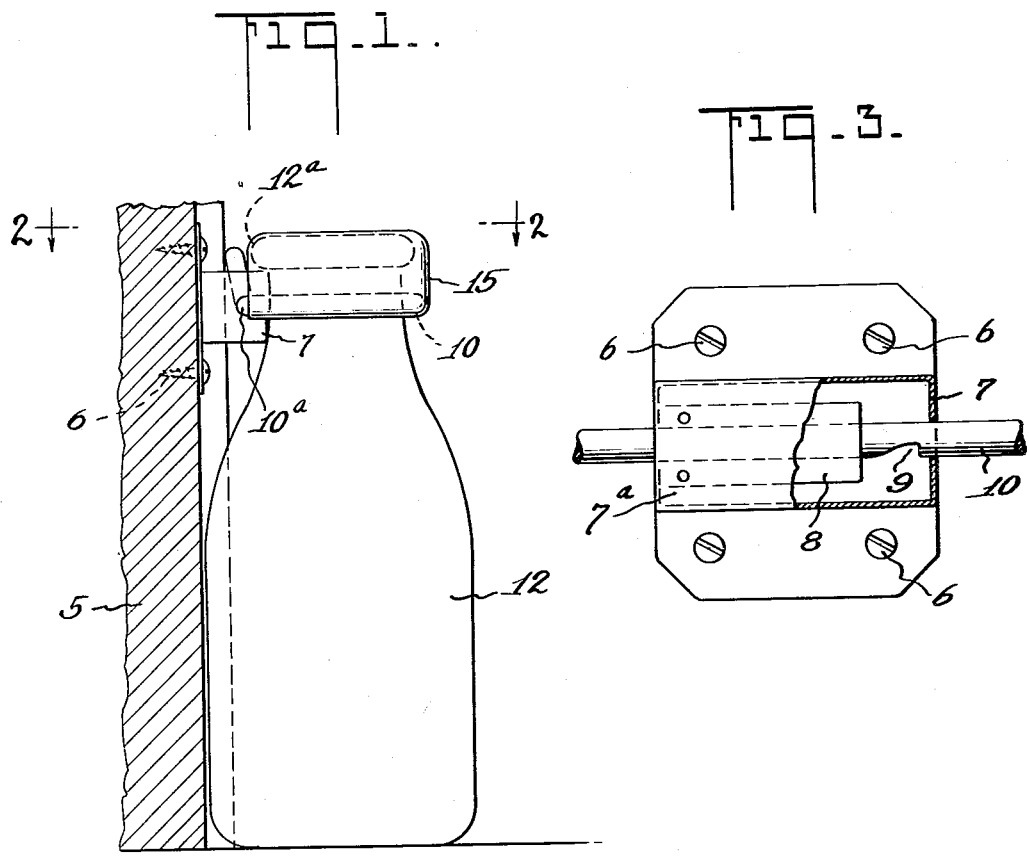
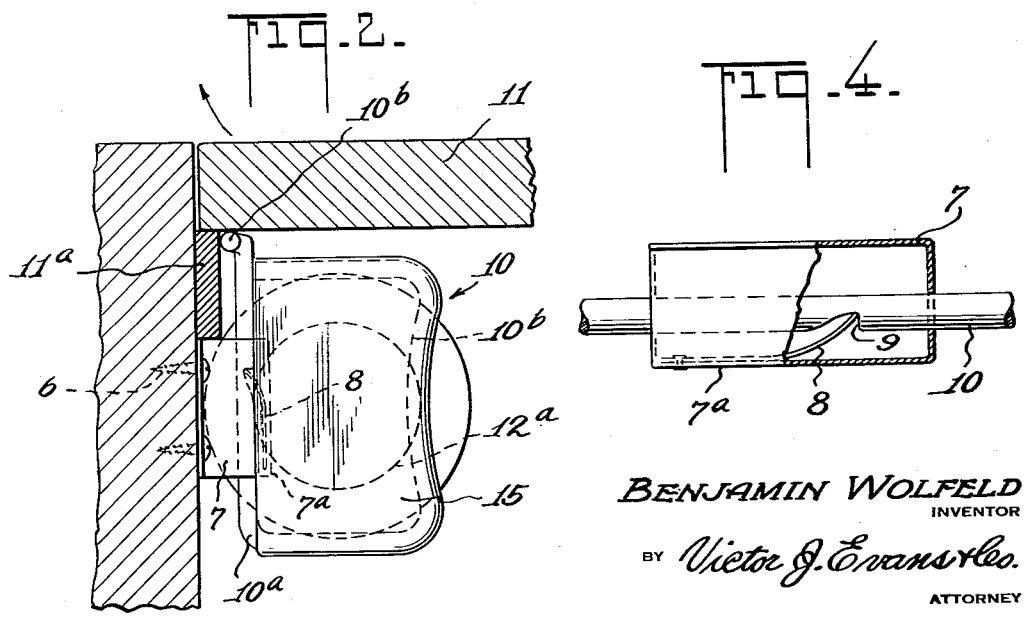
BENJAMIN WOLFELD
INVENTOR
BY Victor J. Evans & Co.
ATTORNEY Patented Mar. 13, 1934

1,951,227

UNITED STATES PATENT OFFICE 1,951,227

MILK BOTTLE LOCK

Benjamin Wolfeld, New York, N. Y.

Application February 8, 1933, Serial No. 655,828

2 Claims. (Cl. 232—42)

This invention relates to devices for locking bottles of milk delivered to the doors of customers.

One of the objects of the invention is the provision of a device of the character mentioned which is simple, inexpensive to manufacture, and efficient.

The invention will be fully and comprehensively understood from a consideration of the following detailed description when read in connection with the accompanying drawing which forms part of the application with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is a side elevation of the device of my invention showing the same holding a bottle of milk in locked position. This view also shows in dotted lines the position of a collar when the device is not in use.

Fig. 2 is a view taken on line 2—2 of Fig. 1.

Fig. 3 is an elevational view, partly broken away, of a casing and a collar (fragmentarily shown), the collar being shown in unlocked position; and Fig. 4 is a view, partly in section, showing the collar locked in the casing.

Referring to the drawing for a more detailed description thereof, the numeral 5 indicates a vertical member of the frame of a doorway, to which member is secured by means of screws 6 a casing 7, the wall 7a of which has secured to its inner face a spring latch 8 adapted to set itself in a notch 9 of the rear portion 10a of a collar 10 when the collar is in a horizontal position. Said rear portion 10a of the collar passes through the end walls of said casing and is mounted so that the collar may be swung up and down and also may be moved toward and away from a door 11 or other releasable stop. Said collar, which is in the form of a loop, is so formed that the rear end portion of the rear part 10a is close to the outer face of the door and said end portion is provided with a bent part 10b which prevents the collar from being raised substantially above its horizontal position due to the fact that said part 10b abuts against the door jamb 11a when the collar is in the horizontal position.

To lock a bottle of milk in the device, the milkman pulls the collar, in its depending position, forwardly or toward himself and away from the door, the construction of the device permitting this because the notch 9 is not in the path of the spring 8 when the collar is in the depending position. The collar is then raised to the horizontal position, in which position the neck of the milk bottle 12 may be inserted in the front part of the space enclosed by the collar. The latter is then pushed rearwardly until the rear end of the part 10a of the collar abuts the door 11, the bottle thereby being pushed with the collar to a position between the wall 7a of the casing and the portion 10b of the collar with the bead 12a of the bottle resting on the top of the casing. During this inward movement of the collar, the spring 8 seats itself in the notch 9 and against the shoulder adjoining it so that the collar cannot then be pulled forwardly. The bottle is thereby locked in the device and is releasable only when the door is opened to allow the collar to be pulled or pushed toward the open door, the latter movement being possible due to the inclined form of the forward part of the notch. The closing of the door is effective to push back the collar to a median position and said collar naturally drops to its depending position.

Attached to said collar is a cap 15 which fits over the top of the bottle to protect the contents.

What is claimed is:

1. A lock for locking a milk bottle to the frame of a door and including, a casing adapted to be attached to the frame of the door, an open rectangular collar mounted in the casing for vertical swinging movement to receive the neck of the bottle and horizontally movable on said casing toward the door to a bottle locking position, a member on said collar abutting the door in said position of the collar, and cooperating devices on said collar and within the casing, respectively, for locking the collar against movement from bottle locking position in a direction away from the door while said member is in said abutting position.

2. A lock for locking a milk bottle to the frame of a door and including, a casing adapted to be attached to the frame of said door, an open rectangular collar for receiving the neck of the bottle mounted in the casing for horizontal movement toward and from said door and having a door abutting portion and a restricted central portion, and means cooperating with said restricted central portion for latching said collar against movement from door abutting position in a direction away from said door.

BENJAMIN WOLFELD.